(12) United States Patent
Magnusson et al.

(10) Patent No.: US 10,753,274 B2
(45) Date of Patent: Aug. 25, 2020

(54) METHOD FOR CONTROLLING A HIGH PRESSURE GAS INJECTION INTERNAL COMBUSTION ENGINE

(71) Applicant: VOLVO TRUCK CORPORATION, Gothenburg (SE)

(72) Inventors: Ingemar Magnusson, Gothenburg (SE); Arne Andersson, Mölnlycke (SE); Lennart Andersson, Varberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 84 days.

(21) Appl. No.: 15/781,131

(22) PCT Filed: Dec. 7, 2015

(86) PCT No.: PCT/EP2015/078866
§ 371 (c)(1),
(2) Date: Jun. 3, 2018

(87) PCT Pub. No.: WO2017/097333
PCT Pub. Date: Jun. 15, 2017

(65) Prior Publication Data
US 2018/0347456 A1 Dec. 6, 2018

(51) Int. Cl.
*F02B 43/12* (2006.01)
*F02D 41/18* (2006.01)
(Continued)

(52) U.S. Cl.
CPC ............. *F02B 43/12* (2013.01); *F02B 7/06* (2013.01); *F02B 7/08* (2013.01); *F02D 19/0692* (2013.01);
(Continued)

(58) Field of Classification Search
CPC ...... F02B 43/12; F02B 7/06; F02B 2043/103; F02B 7/08; F02D 41/403; F02D 41/401;
(Continued)

(56) References Cited

U.S. PATENT DOCUMENTS 6,145,494 A * 11/2000 Klopp ................. F02D 19/0631
123/406.32
6,289,881 B1 * 9/2001 Klopp ................. F02D 19/0631
123/406.32
(Continued)

FOREIGN PATENT DOCUMENTS

DE 19854776 A1 12/1999
DE 102010053498 A1 6/2012
DE 102014208767 A1 11/2015

OTHER PUBLICATIONS

International Search Report (dated Sep. 7, 2016) for corresponding International App. PCT/EP2015/078866.

*Primary Examiner* — Joseph J Dallo
(74) *Attorney, Agent, or Firm* — Venable LLP; Jeffri A. Kaminski

(57) ABSTRACT

A method of controlling a high pressure gas injection internal combustion engine includes injecting, in a first combustion mode, by a first as injection system, a first gaseous fuel into a cylinder of the engine, and accumulating in a container of a second gas injection system excess gaseous fuel from the first fuel system, shifting, in the cylinder, from the first combustion mode to a second combustion mode including determining a value of an air flow related parameter indicative of an air mass flow into the cylinder, determining, based on the determined air flow related parameter value, a value of a fuel flow related parameter indicative of a mass flow of the excess gaseous fuel, and supplying from the container, in accordance with the determined fuel flow related parameter value, the excess
(Continued)

gaseous fuel to provide a premix of air and the excess gaseous fuel to the cylinder.

14 Claims, 5 Drawing Sheets

(51) Int. Cl.
| | |
|---|---|
| *F02D 41/30* | (2006.01) |
| *F02D 41/40* | (2006.01) |
| *F02M 21/02* | (2006.01) |
| *F02D 41/00* | (2006.01) |
| *F02D 19/06* | (2006.01) |
| *F02M 43/00* | (2006.01) |
| *F02B 7/06* | (2006.01) |
| *F02B 7/08* | (2006.01) |
| *F02M 43/04* | (2006.01) |
| *F02D 41/38* | (2006.01) |
| *F02M 21/06* | (2006.01) |
| *F02B 43/10* | (2006.01) |

(52) U.S. Cl.
CPC ....... *F02D 41/003* (2013.01); *F02D 41/0025* (2013.01); *F02D 41/0027* (2013.01); *F02D 41/182* (2013.01); *F02D 41/3094* (2013.01); *F02D 41/401* (2013.01); *F02D 41/403* (2013.01); *F02M 21/0215* (2013.01); *F02M 21/0224* (2013.01); *F02M 21/0245* (2013.01); *F02M 43/00* (2013.01); *F02M 43/04* (2013.01); *F02B 2043/103* (2013.01); *F02D 2041/389* (2013.01); *F02M 21/06* (2013.01); *Y02T 10/32* (2013.01); *Y02T 10/36* (2013.01)

(58) Field of Classification Search
CPC ............... F02D 41/3094; F02D 41/182; F02D 2041/389; F02D 41/0025; F02D 19/0692; F02D 41/003; F02D 41/0027; Y02T 10/32; Y02T 10/36; F02M 21/06; F02M 43/00; F02M 43/04; F02M 21/0245; F02M 21/0215; F02M 21/0224

See application file for complete search history.

(56) References Cited

U.S. PATENT DOCUMENTS

| | | | | |
|---|---|---|---|---|
| 9,279,372 | B2* | 3/2016 | Monros | F02B 43/00 |
| 9,784,152 | B2* | 10/2017 | Monros | F01M 13/04 |
| 9,828,987 | B2* | 11/2017 | Steffen | F04B 49/24 |
| 10,450,970 | B2* | 10/2019 | Huang | F02D 41/403 |
| 2005/0279321 | A1* | 12/2005 | Crawford | F02B 23/0657 |
| | | | | 123/260 |
| 2006/0236975 | A1* | 10/2006 | Munshi | F02M 21/0275 |
| | | | | 123/305 |
| 2006/0254560 | A1* | 11/2006 | Mann | F02B 19/10 |
| | | | | 123/305 |
| 2010/0294250 | A1* | 11/2010 | Jauss | F02D 19/0647 |
| | | | | 123/511 |
| 2011/0301826 | A1* | 12/2011 | Galindo | F01N 3/0814 |
| | | | | 701/103 |
| 2012/0004824 | A1* | 1/2012 | Milton | F02D 19/0647 |
| | | | | 701/103 |
| 2012/0186560 | A1* | 7/2012 | Lund | F02D 19/0642 |
| | | | | 123/495 |
| 2012/0325180 | A1 | 12/2012 | Montgomery | |
| 2014/0041633 | A1 | 2/2014 | Kim et al. | |
| 2014/0091159 | A1* | 4/2014 | Brown | F02M 63/00 |
| | | | | 239/398 |
| 2014/0238340 | A1* | 8/2014 | Dunn | F02M 43/00 |
| | | | | 123/299 |
| 2016/0017845 | A1* | 1/2016 | Huang | F02M 21/0209 |
| | | | | 290/1 A |
| 2017/0037795 | A1* | 2/2017 | Galindo | F02D 41/0025 |
| 2018/0100450 | A1* | 4/2018 | Sauve | F02M 43/04 |
| 2018/0112606 | A1* | 4/2018 | Huang | F02D 41/1401 |
| 2018/0320610 | A1* | 11/2018 | Magnusson | F02D 41/008 |
| 2018/0347456 | A1* | 12/2018 | Magnusson | F02M 43/04 |

* cited by examiner

METHOD FOR CONTROLLING A HIGH PRESSURE GAS INJECTION INTERNAL COMBUSTION ENGINE

BACKGROUND AND SUMMARY

The invention relates to a method for controlling a high pressure gas injection internal combustion engine.

The invention can be applied in heavy-duty vehicles, such as trucks, buses and construction equipment, e.g. working machines. The invention can also be applied to cars. Although the invention will be described with respect to a truck, the invention is not restricted to this particular vehicle type.

High Pressure Gas injection (HPGI) internal combustion engines have been the subject of increasing interest and use for some time. The HPGI technology is also known as the High Pressure Direct Injection (HPDI) technology. It allows natural gas engines to operate at the same efficiency and power as modern heavy-duty diesel engines, but with a better fuel efficiency and reduced greenhouse gas emissions depending on the composition of the gaseous fuel used. The HPGI heavy duty gas engine technology is based on direct in-cylinder injection of gaseous fuel providing conditions for mixing limited combustion, or mixing controlled combustion, similar to the process in conventional diesel engines. The gas is supplied using a special high pressure gas injector. Additional pilot quantities of diesel fuel are injected in order to accomplish ignition.

In HPGI engines there are usually requirements to dispense of high pressure gas, e.g. during a rapid pressure, decrease in the injection system due to a decrease in the engine load, or during an engine stoppage. A need to vent boil-off gas from the liquefied gaseous fuel storage is another common reason for disposing of gas. Such disposal will create an environmental disturbance, since it involves emitting unburned hydrocarbons into the atmosphere. In case of methane gas such emissions also cause wanted contributions to global warming.

CA2868338A1 suggests, for an internal combustion engine with direct gas injection, capturing vented gaseous fuel, storing it in an accumulator, and reintroducing it for engine combustion at a later time. The gaseous fuel from the accumulator is introduced upstream of an air intake compressor and a gas and air premix is thereby added in the cycles in the cylinders before the regular direct gas injection. A problem with this solution is that a large portion, at least 30%, of the captured fuel may not be combusted in the cylinders, and therefore, the relief provided from an environmental point of view is relatively marginal.

It is desirable to reduce emissions from fuel systems of internal combustion engines with high pressure gas injection.

In accordance with an aspect of the invention, a method of controlling a high pressure gas injection internal combustion engine is provided, the method comprising injecting, in a first combustion mode, by means of a first gas injection system, a first gaseous fuel into a cylinder of the engine, and accumulating in a container of a second gas injection system excess gaseous fuel from the first fuel system, characterized by shifting, in the cylinder, from the first combustion mode to a second combustion mode comprising determining a value of an air flow related parameter indicative of an air mass flow into the cylinder, determining based on the determined air flow related parameter value a value of a fuel flow related parameter indicative of a mass flow of the excess gaseous fuel, and supplying from the container, in accordance with the determined fuel flow related parameter value, the excess gaseous fuel to provide a premix of air and the excess gaseous fuel to the cylinder.

The invention provides for avoiding release of the excess gaseous fuel into the atmosphere by combusting a major portion of it. More specifically, determining the fuel flow parameter value based on the determined air flow related parameter value provides for a controlled supply of the excess gaseous fuel for the air and fuel premix which makes it possible to obtain combustion of the excess gaseous fuel which is considerably more complete than in known solutions. As little as only 2-5% of the excess gaseous fuel may remain un-combusted as a result of the second combustion mode. The reason is that the fuel flow related parameter value may be determined so as to provide premixed flame propagation in the cylinder, and therefore combustion of a major part of the excess gaseous fuel in the second cylinder. Thus, the invention may substantially reduce environmental disturbances caused by excess gaseous fuel in high pressure gas injection engines. Further, the invention may substantially increase the amount of useful work provided by the excess gaseous fuel, due to a higher portion of it being combusted in the engine.

Differing from the invention, adding, as suggested in said CA2868338A1, the premix of captured vented gaseous fuel and air before the regular direct gas injection, without any control of the fuel flow for the premix, may result in a major part of the fuel in the premix to exit the cylinder un-combusted. If the premix is lean, and the engine load is low, the combustion may be limited to a mixing controlled combustion of the regular direct gas injection and the premix locally involved in this combustion. However, in other parts of the combustion chamber the premix may not be combusted, and the fuel therein may be evacuated to the atmosphere.

The premixed flame propagation made possible by the invention is similar to the process in gasoline engines. However, determining the fuel flow related parameter value based on the air flow related parameter value makes it possible to obtain an air to fuel ratio providing a premixed flame propagation even if the engine is not equipped with a throttle for the air. Where there is no throttle, the air flow to the engine will depend largely on the engine rotational speed. Thus, the invention provides for adjusting the excess gaseous fuel supply to the detected air flow, and thereby secure a premixed flame propagation combustion. I.e., even though the engine is a "diesel type" HPGI engine, which typically has no throttle, an excess gaseous fuel and air pre-mixture may be provided which provides an "Otto type" premixed flame propagation combustion. Thereby, as opposed to the suggestion in said CA2868338A1, most of the excess gaseous fuel may be combusted even if the engine is in a low load condition. In some embodiments, the provision of the excess gaseous fuel is controlled so as to provide the premix for a load in the cylinder which is kept within an interval of 50-70% of a full load in the cylinder.

It should be noted that the second combustion mode may include, in addition to supplying the excess gaseous fuel to provide the premix, injection by means of the first gas injection system of the first gaseous fuel into the cylinder. For an unchanged load of the cylinder, such an injection of the first gaseous fuel in the second combustion mode is preferably smaller than the injection of the first gaseous fuel in the first combustion mode. As exemplified below, the first gaseous fuel injection in the second mode may serve as a pilot injection to initiate the premixed flame propagation combustion.

The first gas injection system may comprise a container, herein also referred to as a first container, the container of the second gas injection system herein also being referred to as a second container. The first container may be a storage container, e.g. a liquid natural gas (LNG) tank. The first gas injection system may also comprise a third container in the form of a high pressure buffer tank, arrange to be fed with the first gaseous fuel from the first container by means of a high pressure pump.

The second container, i.e. the container of the second gas injection system for accumulating the excess gaseous fuel, may be a small low-pressure gas accumulator. Upon accumulation the excess gaseous fuel may be on demand efficiently burned in the engine by said shifting from the first combustion mode to the second combustion mode. It is understood that the second combustion mode is dissimilar to the first combustion mode.

As exemplified below, the accumulation in the second container may be provided as a result of boil-off gas received from the first container, or upon transportation from the first gas injection system at a pressure decrease therein or during an engine stoppage. Upon such an accumulation, the gaseous fuel will be at a low pressure, and cannot be utilised as fuel in a normal HPGI combustion mode. Therefore, burning the second gaseous fuel in the second combustion mode, with a controlled excess gaseous fuel supply according to the invention, will provide an effective and controllable way to utilise this fuel.

Preferably, the premix has a lambda value of 1.3-1.7, more preferably 1.4-1.6, for example approximately 1.5. This secures a premixed flame propagation and therefore combustion of a major part of the excess gaseous fuel in the cylinder. Thereby, a minimisation of the excess gaseous fuel emissions can be obtained.

Preferably, the step of supplying the excess gaseous fuel comprises injecting the excess gaseous fuel into the cylinder or into a conduit arranged to guide air to the cylinder. For example, in the case of an engine with a plurality of cylinders, the second gas injection system may comprise one or more fuel injectors, and may be arranged to provide the excess gaseous fuel directly into one or more of the cylinders. As exemplified below, such an injection may be provided early enough for the injected excess gaseous fuel to mix with the air in the cylinder(s). Alternatively, the second gas injection system may be arrange to inject the excess gaseous fuel directly to one or more of air conduits dedicated only for the respective cylinder. Such dedicated conduits are also referred to as intake ports. Thereby, the excess gaseous fuel may be injected in the inlet port(s) and premixed with air prior to combustion. The second gas injection system being arranged to provide the excess gaseous fuel directly into one or more of the cylinders or directly to one or more of the air conduits dedicated only for the respective cylinder, allows for supplying the excess gaseous fuel to a selected subgroup of the cylinders only. As discussed below, this provides for an improved engine load control when emptying the container for accumulating the excess gaseous fuel. In alternative embodiments, the excess gaseous fuel is injected into an air conduit which is arranged to guide air to a plurality of, or all of the cylinders, of a multi-cylinder engine.

Preferably, the step of injecting the first gaseous fuel comprises injecting the first gaseous fuel at a first pressure, and the step of injecting the excess gaseous fuel comprises injecting the excess gaseous fuel at a second pressure which is lower than the first pressure. Where the first combustion mode is a high pressure gas injection (HPGI) combustion mode, the first pressure is relatively high. Contrary to this, the excess gaseous fuel is accumulated and injected at a relatively low pressure. It should be noted that the pressure of the injections during the first combustion mode may vary, e.g. based on the engine load. Thus, what is herein referred to as the first pressure may vary depending on the operational situation of the engine. In many embodiments, the first pressure is however in any operational situation preferably higher than the second pressure.

Preferably, the step of injecting the excess gaseous fuel comprises injecting the excess gaseous fuel before a crankshaft angle of 90 degrees before a top dead centre position at the end of a compression stroke of the cylinder. More preferably, the excess gaseous fuel is injected at the end of an induction stroke or at the beginning of the compression stroke of the cylinder. Thereby the excess gaseous fuel is injected early enough for a homogenous premix of air and excess gaseous fuel.

Preferably, the step of injecting the first gaseous fuel comprises injecting the first gaseous fuel after a crankshaft angle of 90 degrees before a top dead centre position at the end of a compression stroke of the cylinder. Where the first combustion mode is an HPGI combustion mode, the first gaseous fuel would be injected at the end of the compression stroke or at the beginning of an expansion stroke of the cylinder. It should be noted that preferably, the first combustion mode comprises no excess gaseous fuel supply.

Preferably, the second combustion mode comprises a pilot injection of a liquid fuel, such as diesel fuel. Thereby, the second combustion mode may provide a dual fuel combustion involving a premix of air and the excess gaseous fuel, and a diesel pilot ignition. The pilot injection is preferably controlled in dependence on the ratio of air and excess gaseous fuel in the premix. The liquid fuel pilot injection auto-ignites and provides thereby an initiation of the premixed flame propagation combustion. Preferably, the injection timing is similar as that of a pure diesel combustion mode.

Preferably, the step of injecting the first gaseous fuel comprises injecting the first gaseous fuel by means of a first injector, and the second combustion mode comprises a pilot injection of the first gaseous fuel by means of the first injector. This is particularly advantageous where the first gaseous fuel, and hence the excess gaseous fuel is natural gas. Natural gas puts higher requirements on the ignition system compared to engines fuelled with gasoline, since more energy from the spark is needed. The pilot injection of the first gaseous fuel assists the initiation of the premixed flame propagation combustion of the second combustion mode. This is particularly advantageous since it allows the use of a smaller capacity Diesel pilot injector than required for the total pilot fuel injection of the second combustion mode. More specifically, where the first combustion mode is an HPGI combustion mode, it may require a smaller amount of pilot fuel in each cycle than the second combustion mode. Using in the second combustion mode the first injector for a pilot injection of the first fuel may supplement a pilot injection of Diesel fuel. Thereby, the capacity of the Diesel pilot fuel injector does not need to be sized for the increased pilot fuel requirements of the second combustion mode. Thus, a relatively small capacity Diesel injector may be used, which is in the interest of cost control. It should be noted however, that in alternative embodiments, no first gaseous fuel is injected into the cylinder in the second combustion mode.

Preferably the method comprises, simultaneously to said step of supplying the excess gaseous fuel to provide a premix of air and the excess gaseous fuel to the cylinder, injecting, in the first combustion mode, by means of the first gas injection system, the first gaseous fuel into a further cylinder of the engine, the further cylinder being herein referred to as a first cylinder, and the cylinder in which the combustion mode is shifted from the first combustion mode to the second combustion mode being herein referred to as a second cylinder. It is understood that the second cylinder is not the first cylinder. It should be noted that the first gaseous fuel may be injected in the first combustion mode into one or more of the cylinders, but less than all cylinders. The excess gaseous fuel may be provided for the second combustion mode in one or more of the remaining cylinder, e.g. in only a single cylinder of the cylinders. It should be noted that in some embodiments, the simultaneous combustion modes in separate cylinders may be accomplished by deactivation of one or more of the remaining cylinders.

The simultaneous first and second combustion modes in separate cylinders allows for retaining effective and fully controllable high pressure injection combustion cycles in some of the cylinders, while the combustion of the excess gaseous fuel may be optimised in another cylinder or in other cylinders. The mode mix also makes it possible to equip only one or some of the cylinders with hardware for allowing the second combustion mode with the excess gaseous fuel, which is in the interest of cost control. Since the excess gaseous fuel is provided only in one, or in a subset of the cylinders, it may be secured that there is enough excess gaseous fuel for sustaining a controlled premix promoting premixed flame propagation combustion. This is particularly useful in a diesel type engine adapted for gaseous fuel, since there is no means to throttle the air provided to the engine. The concentration of the second combustion mode to only one, or a subset of the cylinders, may allow for a lambda value for premixed flame propagation combustion in the second combustion mode.

Preferably, the method comprises, before said step of shifting in the second cylinder from the first combustion mode to the second combustion mode, injecting (S1), in the first combustion mode, by means of the first gas injection system, the first gaseous fuel into all cylinders.

Preferably, the method comprises determining a required load of the engine, and controlling the injection, in the first combustion mode, of the first gaseous fuel into the first cylinder so as to provide a total load of the engine corresponding to the required load. Thereby, the simultaneous first combustion mode in the first cylinder(s) may be adjusted to allow optimization of the second combustion mode in the second cylinder(s) regardless of load requirements on the engine. More specifically, said step of supplying the excess gaseous fuel to provide a premix of air and the excess gaseous fuel to the second cylinder may be controlled so as to provide a lambda value of 1.3-1.7 for the premix, thereby securing premixed lame propagation in the second cylinder, and therefore combustion of a major part of the excess gaseous fuel in the second cylinder. Where there is no throttle on the engine, this may result in limited possibilities to control the load in the second cylinder. However, by controlling the injection, in the first combustion mode, of the first gaseous fuel into the first cylinder so as to provide a total load of the engine corresponding to the required load, both a possibility to meet varying load requirements and a minimisation of the excess gaseous fuel emissions can be obtained.

Preferably, the substantially constant load in the second cylinder corresponds to a load in an interval of 50-70%, preferably approximately 65%, of a full load in the second cylinder. Thus, the provision of the excess gaseous fuel may be controlled so as to provide a load in the second cylinder which is kept within an interval of 50-70% of a full load in the second cylinder, and simultaneously said injection of the first gaseous fuel in the first cylinder(s) may be controlled so as to provide a total load on the engine corresponding to the required load. Thereby, nearly all of the second fuel may be combusted, and at the same time the first combustion mode in the first cylinder(s) may be controlled so as to compensate for any discrepancy between the required load and the load in the second cylinder. For example, if the second cylinder is operating in the second mode at 65% of full load, and the required load is 50%, the first combustion mode can be controlled so as to provide less than 50% of full load in the first cylinder(s), so that the total load provided by the engine corresponds to the required load.

Preferably, the method comprises determining a pressure or gas content in the container, and performing said shift from the first combustion mode to the second combustion mode in dependence on the determined pressure or gas content in the container. In some embodiments, said shift is performed on the condition that the pressure or gas content in the second container is above a threshold value. Thereby, the shift may be performed when the accumulation in the container has reached the capacity of the second container. Also, the shift according to such embodiments may ensure that there is enough excess gaseous fuel in the container to allow the second combustion mode in a controlled manner.

Further advantages and advantageous features of the invention are disclosed in the following description.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
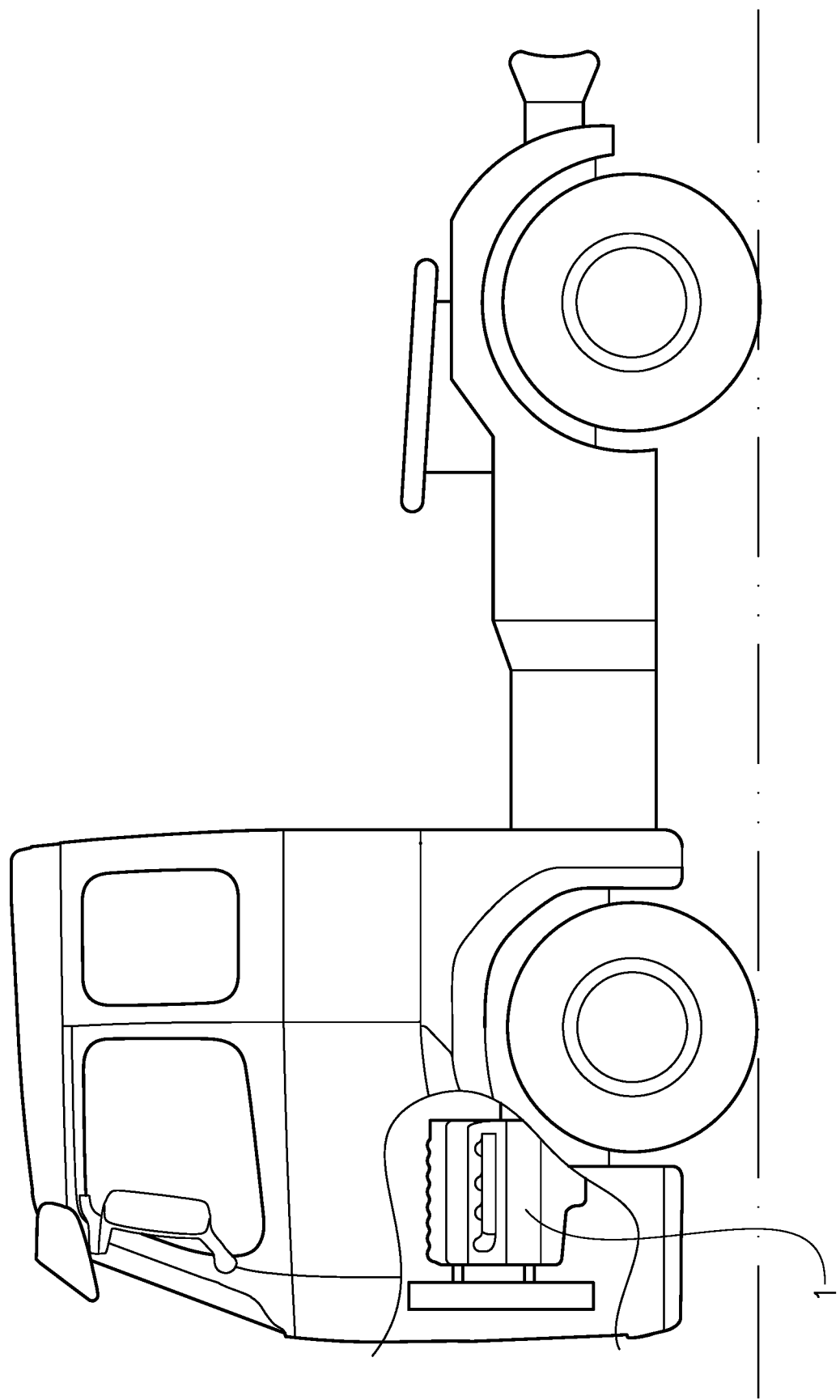
FIG. 1 is a partially sectioned side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises an engine system with a high pressure gas injection (HPGI) internal combustion engine 1.

Figure 2:
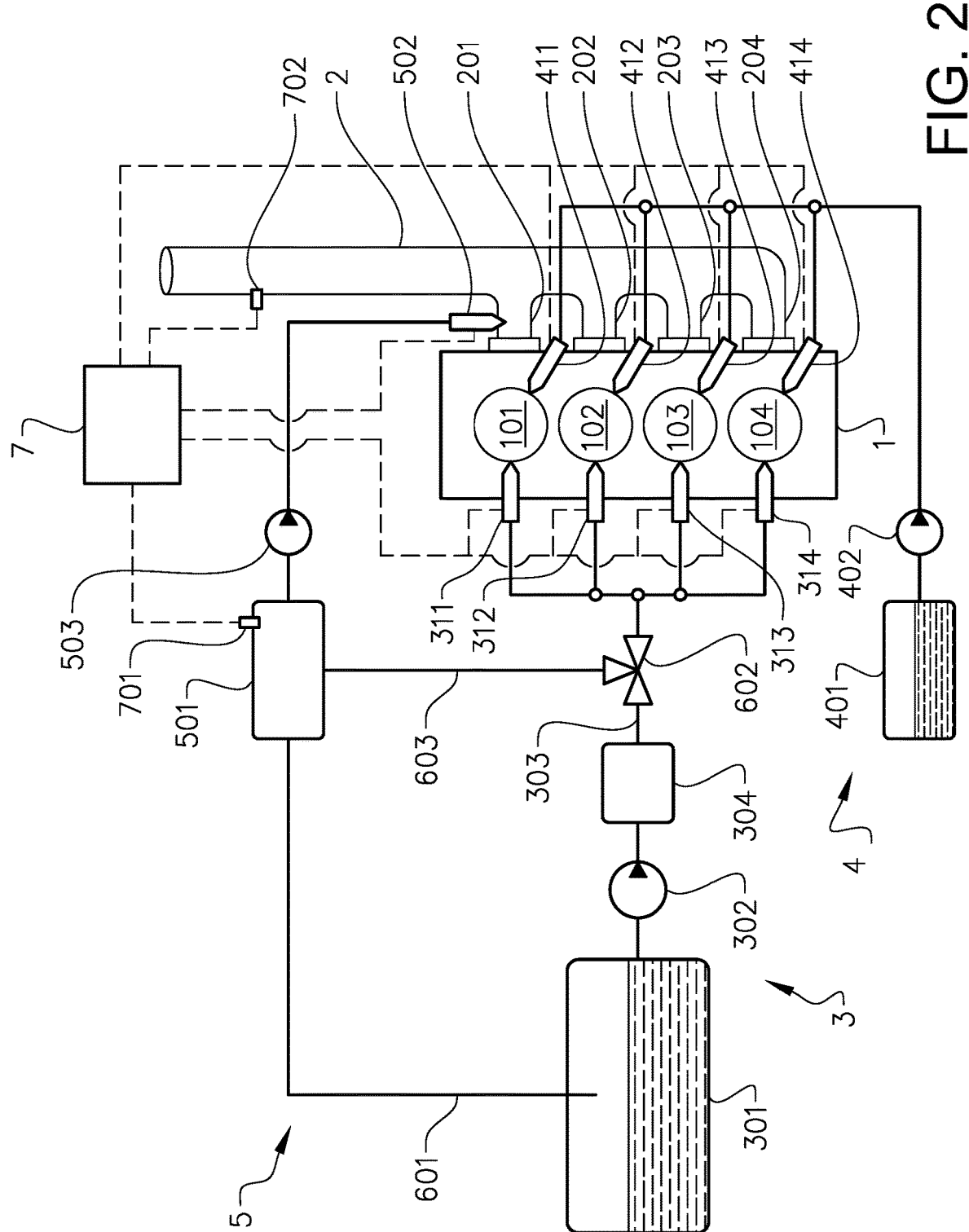
FIG. 2 is a diagram of an engine system in the vehicle in FIG. 1.

FIG. 2 depicts components of the engine system including the engine 1 which has four cylinders 101-104. The engine system comprises an air intake system 2 for the engine 1. The air intake system 2 presents for each cylinder 101-104 an air conduit 201-204 dedicated for a respective of the cylinders 101-104.

The engine system also comprises a first gas injection system 3 for injecting a first gaseous fuel into the cylinders 101-104 at a first pressure. Any suitable type of gaseous fuel may be used; in this example the first gaseous fuel is natural gas comprising methane. Other possible gases include propane and butane. The first gas injection system 3 comprises a first container 301 for the first gaseous fuel to be injected by the first gas injection system 3. The first container 301 is a liquid natural gas (LNG) tank. The first gas injection system 3 further comprises a high pressure injector 311-314 at each cylinder 101-104. The first gas injection system 3 further comprises, between the first container 301 and the high pressure injectors 311-314, a high pressure pump 302. The first gas injection system 3 also comprises an evaporator (not shown). Thus, the high pressure pump 302 is arranged to provide the first gaseous fuel from the first container 301 to the high pressure injectors 311-314, via a high pressure buffer tank 304, herein also referred to as a third container, and a high pressure fuel conduit 303.

It should be noted that the high pressure injectors 311-314 are arranged to change the fuel injection pressure, e.g. based on the engine load. Thus, what is herein referred to as the first pressure may vary depending on the operational situation of the engine.

The engine system also comprises a pilot fuel system 4 for injecting a pilot fuel into the cylinders 101-104. Any suitable type of pilot fuel may be used; in this example the pilot fuel is diesel. In alternative embodiments, the pilot fuel may be dimethyl ester (DME). The pilot fuel system 4 comprises a pilot fuel tank 401 and a pilot fuel injector 411-414 at each cylinder 101-104. The pilot fuel system 4 further comprises, between the pilot fuel tank 401 and the pilot fuel injectors 411-414, a pilot fuel pump 402. Thus, the pilot fuel pump 402 is arranged to provide the pilot fuel from the pilot fuel tank 401 to the pilot fuel injectors 411-414. It should be noted that in each cylinder 101-104 the respective high pressure injector 311-314 and pilot fuel injector 411-414 may be provided as separate units, or combined in a single combination injector, as is known per se.

In accordance with this embodiment of the invention, the engine system comprises a second gas injection system 5 for providing a second gaseous fuel to the engine 1 at a second pressure which is lower than the first pressure, at which the first gaseous fuel is injected. The second gaseous fuel is excess gaseous fuel from the first gas injection system 3, and is accumulated as exemplified below. The second gas injection system 5 comprises an injector 502, herein also referred to as a low pressure injector 502, arranged to inject fuel into one of the air conduits 201.

In other embodiments, a low pressure injector 502 may be arranged to inject fuel into a respective of a plurality of the air conduits 201-204, which could be less than all, or all of the conduits 201-204. In further embodiments, a low pressure injector 502 could be arranged to inject the second gaseous fuel directly into a respective of one or more of the cylinders 101-104.

The second gas injection system 5 comprises a second container 501 for the second gaseous fuel. The second gas injection system 5 further comprises, between the second container 501 and the low pressure injector 502, a low pressure fuel pump 503. Thus, the low pressure pump 503 is arranged to provide the second gaseous fuel from the second container 501 to the low pressure injector 502. It should be noted that in some embodiments, the pressure in the second container 501 may be such that no low pressure pump 503 needs to be provided. Instead a pressure regulator or a valve may be arranged to control the pressure at the low pressure injector 502. In further embodiments, no pump, pressure regulator or valve is provided between the second container 501 and the low pressure injector 502.

The low pressure injector 502 pressure is arranged to control, as exemplified below, a supply of the second gaseous fuel based on signals from a pressure sensor 701 in the second container 501, and in accordance with determined values of a fuel flow related parameter in the form of a flow of the second gaseous fuel.

In accordance with this embodiment of the invention, the second container 501 is arranged to accumulate first gaseous fuel from the first container 301. Thus, the first gaseous fuel and the second gaseous fuel are in this embodiment of the same type. The first gaseous fuel accumulated in the second container 501 is herein also referred to as second gaseous fuel, or excess gaseous fuel from the first gas injection system 3. The transport of gaseous fuel from the first container 301 to the second container 501, whereby it in this presentation of this embodiment changes its name from the first gaseous fuel to the second gaseous fuel or to the excess gaseous fuel, may occur in at least three ways:

a) Boil-off gas from the first container; i.e. when the temperature of the first gaseous fuel increases resulting increased saturated gas pressure. The first gaseous fuel forming boil-off gas is transported from the first container 301 to the second container 501 via a boil-off conduit 601.

b) When gas injection pressure in the first gas injection system 3 is decreased during operation of the engine, e.g. due to a decrease in the engine load, the first gaseous fuel in the high pressure fuel conduit 303 is transported via a relief valve 602 in the high pressure fuel conduit 303, and a relief conduit 603, to the second container 501. The release valve 602 is adapted to adjust its setting based on an actual injection pressure exceeding a desired injection pressure. When there is an excess of pressure in the high pressure fuel conduit 303, the release valve 602 will open a connection between the high pressure fuel conduit 303 and the relief conduit 603.

c) When the engine is stopped, the high pressure fuel conduit 303 is emptied from the first gaseous fuel, which is transported via the relief valve 602 in the high pressure fuel conduit 303, and the relief conduit 603, to the second container 501.

The engine system further comprises a control unit 7 which is arranged to control the high pressure injectors 311-314 individually, to control the pilot fuel injectors 411-414 individually, and to control the low pressure injector 502. The control unit 7 is further arranged to receive signals from a pressure sensor 701 in the second container 501 to determine the pressure therein.

The control unit 7 is also arranged to receive signals from a mass air flow (MAF) sensor 702, located in the intake system 2, upstream of the air conduits 201-204. The control unit is arranged to determine based in the signals from the MAF sensor 702 values of an air flow related parameter in the form of the air mass flow to the cylinders 101-104.

It should be noted that in alternative embodiments, the air flow related parameter may be some other parameter, which is nevertheless indicative of the air mass flow into the cylinders 101-104. For example, the air flow related parameter may be the pressure in the intake system 2, determined by means of a manifold absolute pressure (MAP) sensor.

As exemplified below, the control unit 7 is arranged to determine, based on the determined air mass flow, values of the flow of the second gaseous fuel. The control unit 7 is further arranged to control the low pressure injector 502 so as to supply from the second container 501, in accordance with the determined values of the second gaseous fuel flow, the second gaseous fuel to provide a premix of air and the second gaseous fuel to the cylinder 101.

In addition, the control unit 7 is arranged to determine the load of the engine during its operation in the vehicle, as is known per se, e.g. based on signals from the MAF sensor 702, and/or an accelerator pedal position (APP) sensor, (not shown).

Figure 3:
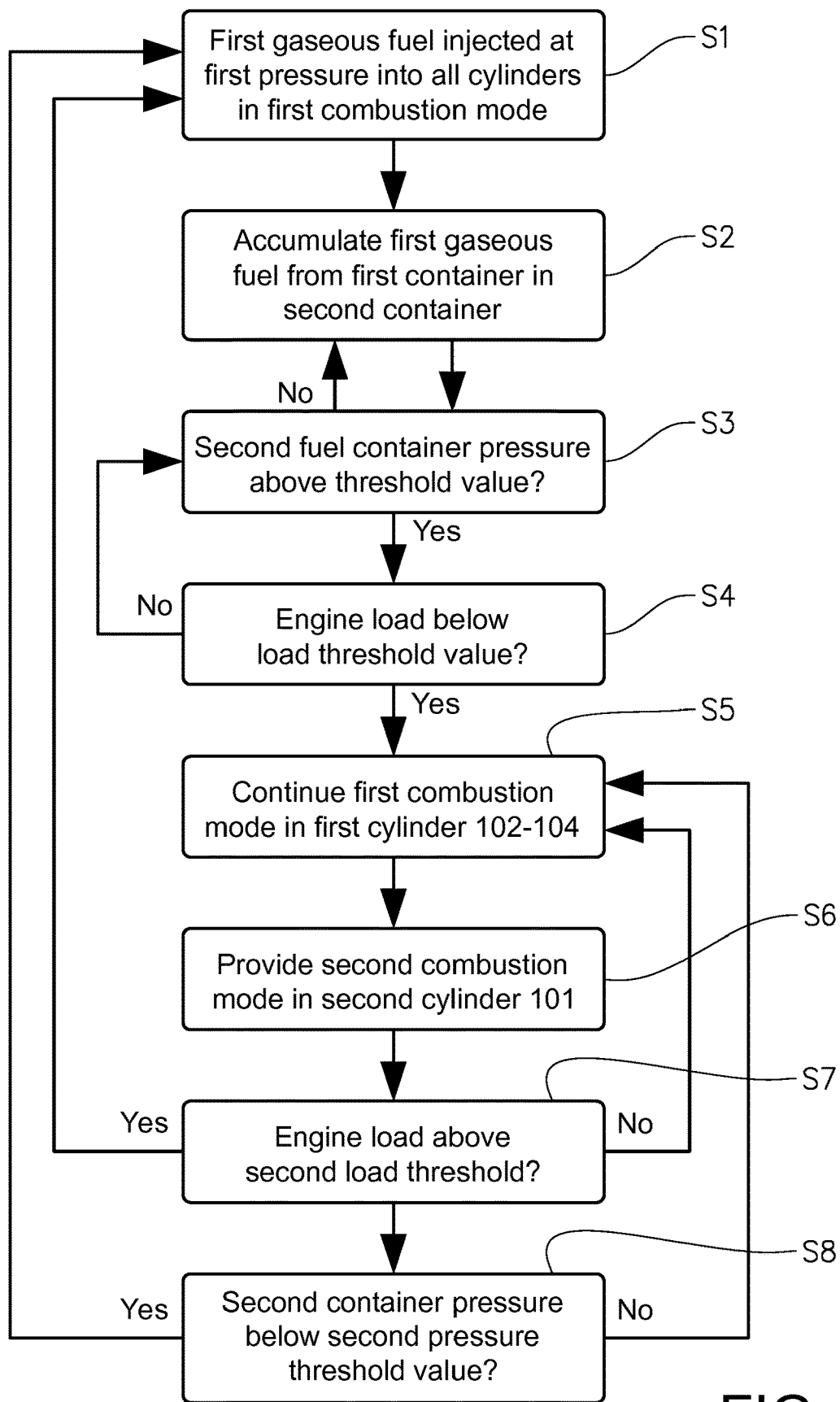
FIG. 3 and FIG. 4 are flow diagrams depicting steps in a method in the engine system in FIG. 2.
Figure 4:
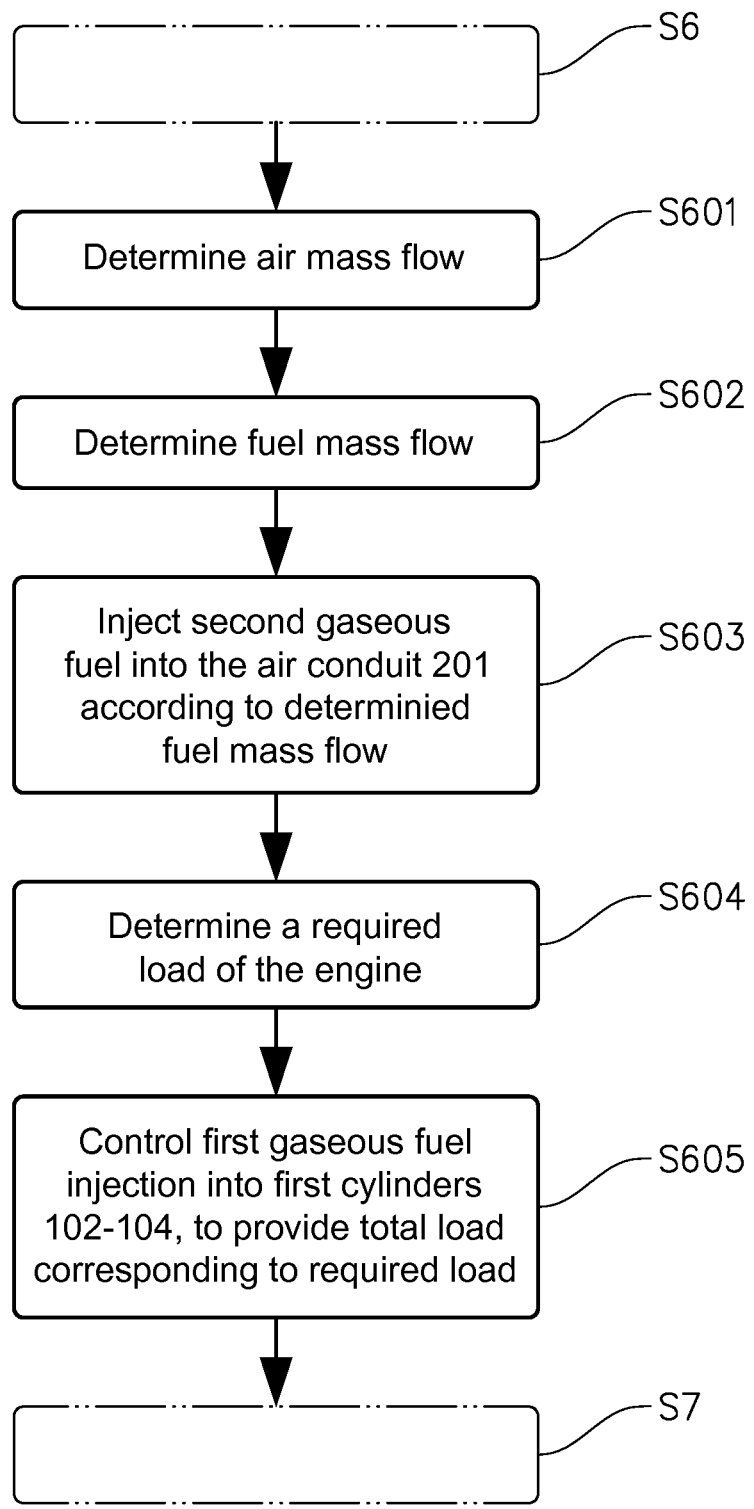

With reference to FIG. 3 and FIG. 4, a method according to an embodiment of the invention will be described.

As a starting point in this example, the engine 1 is operating with all cylinders in the same combustion mode, herein referred to as the first combustion mode. Thereby, the first gaseous fuel is injected S1 at a first pressure into all cylinders 101-104. Thereby, the high pressure injectors 311-314 and the pilot fuel injectors 411-414 at all cylinders are controlled for main injections of the first gaseous fuel from the first container 301 and pilot fuel injections for auto-ignition of diesel fuel. Thereby the first gaseous fuel is combusted in a process similar to that of a combustion with diesel fuel only.

While the engine is operating with all cylinders in the first combustion mode, first gaseous fuel from the first container 301 is accumulated S2 in the second container 501, for example as mentioned above, i.e. (a) as boil-off gas received via the boil-off conduit 601, or (b or c) transported via the relief valve 602 and the relief conduit 603 at a first gas injection system pressure decrease or during a temporary engine stoppage.

Also, while the engine is operating with all cylinders in the first combustion mode, the pressure in the second fuel container 501 is continuously monitored by the control unit 7 by means of the pressure sensor 701. The control unit 7 determines S3 whether the second fuel container pressure is above a threshold value, herein also referred to as a first pressure threshold value. If the second fuel container pressure is above the first pressure threshold value, the control unit 7 determines S4 whether the load of the engine is below a load threshold value, herein also referred to as a first load threshold value.

If the second container pressure is above the first pressure threshold value, and the load is below the first load threshold value, the first combustion mode as described above is continued S5 in a first subset of the cylinders, herein also referred to as first cylinders 102-104. However, in one of the cylinders, herein referred to as the second cylinder 101, the first combustion mode is replaced S6 by a second combustion mode.

Reference is wide to FIG. 4 showing steps in the control of the first and second combustion modes. When the second combustion mode is introduced in the second cylinder 101, the second gaseous fuel stored in the second fuel container 501 is pumped to the low pressure injector 502, from which it is provided to the air conduit 201 leading to the second cylinder 101. The low pressure injector 502 injects the second gaseous fuel at the second pressure which is as stated lower than the first pressure by which the first gaseous fuel is injected. The low pressure injector 502 is controlled to control the flow of the injected second gaseous fuel as follows:

The control unit 7 determines 5601 based on signals from the MAF sensor 702 a value of the air mass flow. Based on the determined air mass flow, the control unit determines S602 a value of the mass flow of the second gaseous fuel. The fuel mass flow is chosen so as to provide a premix with a lambda value of approximately 1.5. The control unit 7 then controls the low pressure injector 502 so as to supply S603 from the second container 501 the second gaseous fuel by injecting at the determined fuel mass flow value the second gaseous fuel into the air conduit 201 leading to the second cylinder 101. This will provide the premix of air and the second gaseous fuel to the second cylinder 101. The lambda value of approximately 1.5 will provide a premixed flame propagation combustion in the second cylinder 101, resulting in a major part of the second gaseous fuel being combusted.

To keep the lambda value constant in view of a fluctuating air mass flow, the steps of determining S601 the air mass flow, and determining S602 the second gaseous fuel mass flow are continuously repeated. As a result of the engine being un-throttled, if the engine rotational speed is within a range normally provided during non-transient conditions giving a steady air mass flow, said premix control will in this example provide in a constant load in the second cylinder 101 corresponding to approximately 65% of the full load in the second cylinder.

Since the load provided by the second cylinder 101 is substantially constant, the following steps are carried out to compensate for any discrepancy between the required load on the engine and the share of the engine load provided by the second cylinder. The control unit 7 determines S604 a required load of the engine, and controls S605 the injection, in the first combustion mode, of the first gaseous fuel into the first cylinders 102-104 so as to provide a total load of the engine corresponding to the required load.

For example, where the second cylinder 101 is operating in the second mode providing a substantially constant load of 65% of full load, and the required load is 50%, the first combustion mode is controlled so as to provide less than 50% of full load in the first cylinders 102-104, so that the total load provided by the engine corresponds to the required load.

Figure 5:
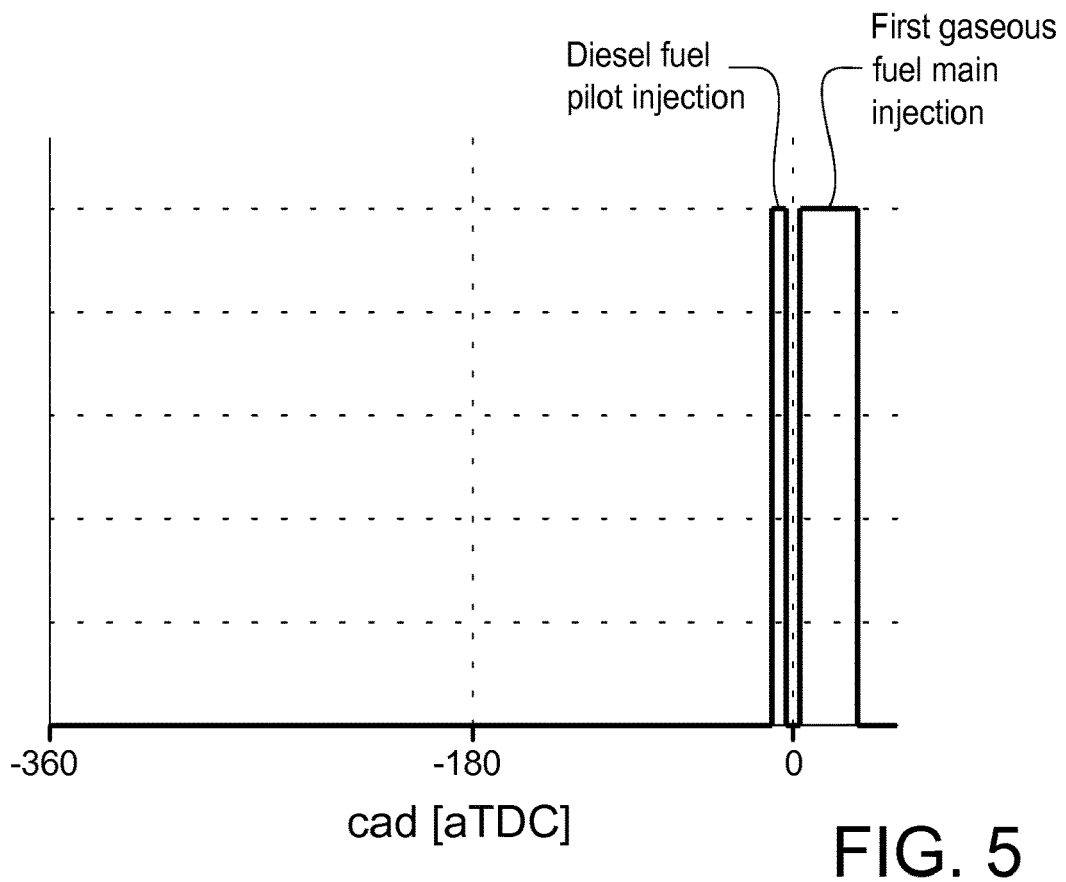
FIG. 5 and FIG. 6 show diagrams depicting fuel injections in combustion modes provided by the method in FIG. 3 and FIG. 4, as functions of the crankshaft angle.

FIG. 5 shows a diagram depicting fuel injections in the first combustion mode as a function of the crankshaft angle (CAD) of the first cylinders 102-104. This combustion mode is known per se as a HPGI combustion mode. It involves the a pilot injection by means of the pilot fuel injectors 412-414 in the first cylinders 102-104 of diesel fuel, at the end of the compression stroke, close to the top dead centre (TDC) position. A main injection of the first gaseous fuel by means of the high pressure injectors 312-314 in the first cylinders 102-104 is provided at the beginning of the expansion stroke.

Figure 6:
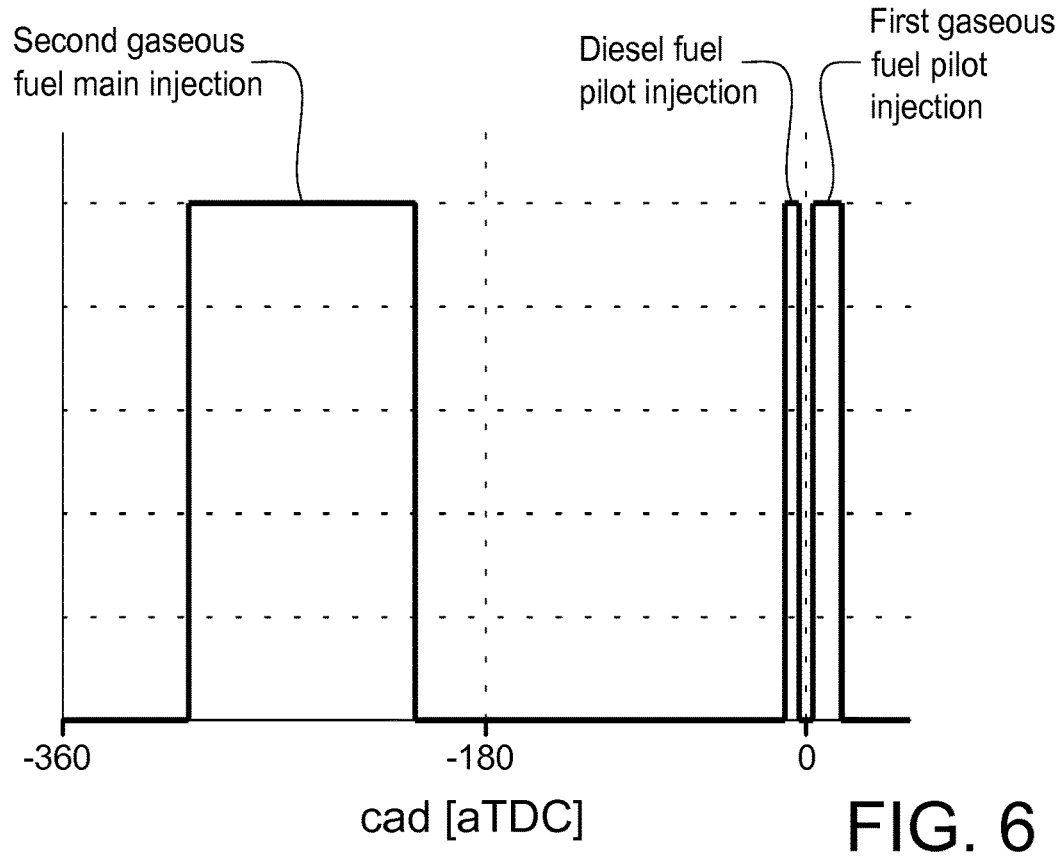

FIG. 6 shows a diagram depicting fuel injections in the second combustion mode as a function of the crankshaft angle of the second cylinder 101. The second gaseous fuel is injected well into the air conduit 201 leading to the second cylinder 101 at the end of an induction stroke of the second cylinder 101. Thereby the excess gaseous fuel is injected early enough for the air and fuel premix to be introduced to the second cylinder 101 and homogenously mixed. As mentioned, the low pressure injector 502 may be alternatively arranged to inject fuel directly into the second cylinder 101. Also, alternatively, the second fuel may be injected at the beginning of the compression stroke of the cylinder.

Further, a pilot injection of diesel fuel is provided by means of the pilot fuel injector 411 in the second cylinder 101, at the end of the compression stroke. In addition, a pilot injection of the first gaseous fuel by means of the high pressure injector 311 in the second cylinder 101 is provided at the beginning of the expansion stroke. The pilot injections auto-ignite and provides thereby an initiation of the premixed flame propagation combustion of the air fuel premix. The additional pilot injection of first gaseous fuel provides additional energy needed to ignite the air and fuel premix, compared to the ignition energy needed in the first combustion mode.

During the compression stroke in the second combustion mode, the pressure and temperature of the premixed charge is increased, however, not to levels at which a premature auto-ignition would occur. Instead ignition is accomplished by the pilot injections and auto-ignition of the diesel fuel and the first gaseous fuel. It should be noted that the pilot injections, e.g. the amount of pilot fuel injected in each cycle, is controlled in dependence on the determined ratio of air to second gaseous fuel, as discussed above. The premixed second gaseous fuel and air charge is subsequently combusted in a controlled flame propagation process.

It should be noted that during the dual combustion mode operation of the engine, the first gaseous fuel injection in the first cylinders 102-104 is controlled, in addition to the engine load control as exemplified above, so as to optimise the ignition events for the dual fuel operation. More specifically, the amount of first gaseous fuel during the dual combustion mode operation is controlled to assure optimum conditions in terms of power efficiency, methane oxidation efficiency and safety margins towards knock.

If during the dual combustion mode the load of the engine is increased above second load threshold value, the combustion mode in the second cylinder 101 is shifted S7 from the second combustion mode back to the first combustion mode, so that all cylinders are operating with the high pressure first gaseous fuel injections. Thereby, a priority can be given to power requirements during certain vehicle operational situations.

When the pressure in the second container 501 has degreased below a second threshold S8, the combustion mode in the second cylinder 101 is shifted from the second combustion mode back to the first combustion mode. Thereby, when a major portion of, or all of, the gaseous fuel collected in the second container 501 has been burned off in the second cylinder 101, all cylinders will again be operating in the first combustion mode.

Thus, since the second container 501 is arranged to accumulate first gaseous fuel from the first container 301 as described, emissions of the first gaseous fuel from the first gas injection system 3 may be avoided, thereby reducing the environmental impact of the vehicle. It should be noted that the size of the second container 501 may be small in relation to the first container 301. In some embodiments, providing the second container 501 in the form of a pipe could suffice. The size of the second container should however, be sufficient for allow the second combustion mode with the air to fuel ratio as exemplified above. Also the size of the second container should be large enough to receive all gaseous fuel when the engine is stopped as described above. Since the pressure in the second container 301, e.g. 10-15 bar, is lower that the pressure in the third container 304, a reduced strength of the second container 501 is allowed.

Several alternative combustion processes for the second combustion mode could be considered. In alternative embodiments, the second combustion mode may comprise a homogenous charge compression ignition (HCCI) of the second gaseous fuel provided at the second pressure. In such a case, no pilot fuel injection would be required in the second combustion mode. Suitably, where the second combustion mode involves HCCI, the supply of the second gaseous fuel based on the air mass flow is controlled so as to provide a lambda value of the premix charge of 2.0-2.5.

As mentioned, in some embodiments, a low pressure injector 502 may be arranged to inject the second gaseous fuel into a respective of all of the air conduits 201-204, or a low pressure injector 502 could be arranged to inject the second gaseous fuel directly into a respective of all of the cylinders 101-104. In further embodiments, a low pressure injector 502 may be arranged in inject the second gaseous fuel into the air intake system 2, upstream of the air conduits 201-204, so as for the second fuel to reach all cylinders 101-104. In embodiments where one or more low pressure injectors 502 are arranged to provide the second gaseous fuel to all cylinders, all cylinders may operate in the second combustion mode simultaneously.

It is to be understood that the present invention is not limited to the embodiments described above and illustrated in the drawings; rather, the skilled person will recognize that many changes and modifications may be made within the scope of the appended claims.

The invention claimed is:

1. A method of controlling a diesel type high pressure gas injection internal combustion engine, the method comprising injecting, in a first combustion mode, by means of a first gas injection system, a first gaseous fuel into a cylinder of the engine, the step of injecting the first gaseous fuel comprising injecting the first gaseous fuel after a crankshaft angle of 90 degrees before a top dead centre position at the end of a compression stroke of the cylinder, accumulating in a container of a second gas injection system excess gaseous fuel from the first fuel system, and shifting, in the cylinder, from the first combustion mode to a second combustion mode comprising determining a value of an air flow related parameter indicative of an air mass flow into the cylinder, wherein the second combustion mode further comprises determining, based on the determined air flow related parameter value, a value of a fuel flow related parameter indicative of a mass flow of the excess gaseous fuel, and supplying from the container, in accordance with the determined fuel flow related parameter value, the excess gaseous fuel to provide a premix of air and the excess gaseous fuel to the cylinder, wherein the premix has a lambda value of 1.3-1.7.

2. A method according to claim 1, wherein the step of supplying the excess gaseous fuel comprises injecting the excess gaseous fuel into the cylinder or into a conduit arranged to guide air to the cylinder.

3. A method according to claim 2, wherein the step of injecting the first gaseous fuel comprises injecting the first gaseous fuel at a first pressure, and the step of injecting the excess gaseous fuel comprises injecting the excess gaseous fuel at a second pressure which is lower than the first pressure.

4. A method according to claim 2, wherein the step of injecting the excess gaseous fuel comprises injecting the excess gaseous fuel before a crankshaft angle of 90 degrees before a top dead centre position at the end of a compression stroke of the cylinder.

5. A method according to claim 1, wherein the second combustion mode comprises a pilot injection of a liquid fuel.

6. A method according to claim 1, wherein the step of injecting the first gaseous fuel comprises injecting the first gaseous fuel by means of a first injector, and the second combustion mode comprises a pilot injection of the first gaseous fuel by means of the first injector.

7. A method according to claim 1, comprising, simultaneously to the step of supplying the excess gaseous fuel to provide a premix of air and the excess gaseous fuel to the cylinder, injecting, in the first combustion mode, by means of the first gas injection system, the first gaseous fuel into a further cylinder of the engine, the further cylinder being a first cylinder, and the cylinder in which the combustion mode is shifted from the first combustion mode to the second combustion mode being a second cylinder.

8. A method according to claim 1, comprising determining a required load of the engine, and by controlling the injection, in the first combustion mode, of the first gaseous fuel into the first cylinder so as to provide a total load of the engine corresponding to the required load.

9. A method according to claim 8, wherein the load in the second cylinder corresponds to a load in an interval of 50-70% of a full load in the second cylinder.

10. A method according to claim 1, comprising determining a pressure or gas content in the container,
and performing the shift from the first combustion mode to the second combustion mode in dependence on the determined pressure or gas content in the container.

11. A method according to claim 10, comprising performing the shift on the condition that the pressure or gas content in the second container is above a threshold value.

12. A computer comprising a computer program for performing the steps of claim 1 when the program is run on the computer.

13. A non-transitory computer readable medium carrying a computer program for performing the steps of claim 1 when the program is run on a computer.

14. A control unit being arranged to perform the steps of the method according claim 1.

* * * * *